United States Patent [19]

Levy

[11] 4,176,655

[45] Dec. 4, 1979

[54] SOLAR ENERGY COLLECTION SYSTEM AND APPARATUS FOR SAME UTILIZING LATENT ENERGY STORAGE FLUID

[76] Inventor: Sidney Levy, 145 W. Cuthbert Blvd., Oaklyn, N.J. 08107

[21] Appl. No.: 791,044

[22] Filed: Apr. 26, 1977

[51] Int. Cl.² ............................ F24J 3/02; C09K 3/18; F03G 7/02
[52] U.S. Cl. .................................... 126/436; 126/400; 252/70; 237/1 A; 60/641; 126/419
[58] Field of Search ........................ 126/270, 271, 400; 165/32, 40, 104 S, 104 M; 252/71, 73, 70; 60/641

[56] References Cited

U.S. PATENT DOCUMENTS

| | | | |
|---|---|---|---|
| 3,915,148 | 10/1975 | Fletcher et al. | 126/271 |
| 3,952,519 | 4/1976 | Watson | 126/400 |
| 3,957,030 | 5/1976 | Davis | 126/270 |
| 3,960,205 | 6/1976 | Laing | 126/400 |
| 4,047,518 | 9/1977 | Anderson | 126/271 |
| 4,050,503 | 9/1977 | Buckley | 165/32 |
| 4,056,094 | 11/1977 | Rosenbuerg | 126/271 |
| 4,063,546 | 12/1977 | Schmid et al. | 126/271 |
| 4,100,091 | 7/1978 | Powell | 126/400 |
| 4,111,189 | 9/1978 | Dizon | 126/400 |

OTHER PUBLICATIONS

Kaelble et al., "Crystalline Polymers as Heat Storage Materials In Passive Thermal Protection Systems", Polymer Engineering and Science, vol. 15, No. 9, Sep. 1975, pp. 673–678.

Primary Examiner—Samuel Scott
Assistant Examiner—Larry Jones

[57] ABSTRACT

A solar energy collection and utilization storage system is constructed by using a lenticulated transparent element closed at the back to form channels which are used to carry an energy storage fluid. The lenticulations are designed as light trapping surfaces so that virtually all of the energy from the sun at any time of day falling on the sheet is trapped by the lenticulations and transferred to an energy storage fluid which is in the passages formed by the lenticulations and the back cover panel. The rate of flow through the solar collector panel is controlled by a thermostatic valve element which opens the flow when the fluid reaches a predetermined temperature. The energy storage fluid is a dispersion of a crystalline polymer in a heat transfer fluid which has the capacity of storing heat by a latent heat of crystallization as well as by sensible heat. By use of a suitable polymer the energy storage fluid can store energy at a high enough temperature to produce a significant amount of shaft power utilizing a heat engine. The remainder of the system comprises a storage container, suitable fluid connecting lines, a heat exchanger to extract sensible heat, and means to circulate the fluid through the system.

The combination of the flat panel collector and the efficient energy storage fluid combine to make an effective collector system which can be employed to drive a heat pump for heating and cooling or to generate electric power.

19 Claims, 7 Drawing Figures

Table 1. Summary of Phase Change Material Properties

| Polymer | Supplier | Product designation | $T_m$*, °C | $T_m$*, °F | $\Delta H_m$*, cal/gm | $\Delta H_m$*, btu/lb | Density, gm/cc | Thermal cond.* |
|---|---|---|---|---|---|---|---|---|
| Linear polyethylene | Phillips Petroleum Bartlesville, Okla. 74003 Res. & Dev. Dept. | Marlex 6050 (95% cryst.) | 132 | 270 | 44.0 | 79.2 | .94 to .96 | 11 to 12.4 |
| Isotactic polypropylene | Avisun Co. 215 12th Phil., Pa. 19107 | Gen. purpose 1016 (60 to 70% cryst.) | 166 | 338 | 16.0 | 28.8 | .90 to .92 | 2.8 |
| Polymethylene oxide | Dupont Wilmington, Del. 19898 Plastics Dept. | Delrin 100 series (40% cryst.) | 181 | 358 | 38.0 | 68.4 | 1.42 | 5.5 |
| Polyethylene oxide | Union Carbide Corp. Chemicals & Plastics 270 Park Ave. N. Y. 10017 | Polyox WSRN10 | 57 | 135 | 22.6 | 40.7 | 1.15-1.26 | — |
| Poly E-caprolactam (Nylon 6) | BASF-Color & Chem. Co. 866 Third Ave. N. Y. 10022 | ULTRAMID-B6 (10-70% cryst.) | ----degrades---- | | | | 1.14 | 5.85 |
| Polyhexamethylene adipamide (Nylon 66) | BASF (as above) | ULTRAMID-AK3 | ----degrades---- | | | | 1.13 | 5.85 |
| Trans-polyisoprene conditioned: 23°C  —60°C | Polymer Corp. Ltd. Sarnia, Ontario | TRANS-PIP | 35  52 | 95  125.6 | 6.65  8.18 | 12.0  14.7 | —  — | —  — |

* Thermal conductivity, $10^{-4}$ cal/sec/sq cm/1(°C/cm).

FIG. 7

SOLAR ENERGY COLLECTION SYSTEM AND APPARATUS FOR SAME UTILIZING LATENT ENERGY STORAGE FLUID

BACKGROUND OF THE INVENTION

Solar energy collector systems are generally one of two types. They are flat panel collector systems using a radiant energy absorbing fluid behind the transparent cover of the collector panel or they are optical concentration systems which use lens or mirror optics to concentrate the incident radiation on to a smaller area collector tube or other absorber which contains the working energy absorbing fluid. In general the flat panel collectors are much less costly to manufacture and they do not require tracking of the sun for good efficiency. They generally do not provide high fluid temperatures and are not suitable for generation of shaft power. The optical concentrator type of solar collector is usually fairly expensive to manufacture as compared with the flat panel and, for good efficiency, should be tracked to follow the sun. The tracking system adds to the cost and complexity of the system and reduces the reliability. The optical concentrator units do have the advantage that they do generate temperatures and are capable of heating the collector fluid to temperatures which are capable of generating substantial amounts of shaft power.

The present invention deals with a collector panel which combines the best features of the two types described and which is capable of producing working fluid temperatures high enough to generate shaft power. By the use of a novel working fluid composition a large amount of energy can be stored per unit of mass by a latent heat mechanism and released isothermally at an elevated temperature which provides for efficient energy release to generate shaft work in a heat engine.

SUMMARY OF THE INVENTION

Accordingly, it is an object of the present invention to provide a solar energy collection system of novel design which utilizes simplified construction and efficient collection of incident solar radiation with high fluid temperatures.

It is another object of the present invention to provide a flat panel collector which is less costly to manufacture.

It is a further object of this invention to provide a solar collector panel with a lenticulated construction which is capable of trapping all of the incident solar radiation.

It is a still further object of this invention to provide a lenticulated construction solar collector panel which is capable of collecting the incident radiation at virtually any angle without the necessity of tracking the sun.

It is yet another object of the present invention to provide a solar collector fluid to be used in conjunction with the flat panel collectors which is capable of storing large amounts of energy by a latent heat storage mechanism that can be isothermally released at an elevated temperature.

It is a final object of the present invention to provide a solar energy collector system which is capable of storing solar energy at a sufficiently high temperature that the system is capable of producing shaft work when the working fluid is used in conjunction with a suitable heat engine.

BRIEF DESCRIPTION OF THE DRAWINGS

With the above advantages and with other features as will be hereinafter described, this invention comprises the devices, materials, constructions, combinations, and arrangements of parts shown by way of example and illustrated in the accompanying drawings of a preferred embodiment in which:

FIG. 7 is a table of a number of polymers usable on the system of the present invention.

DESCRIPTION OF THE PREFERRED EMBODIMENT

Figure 1:
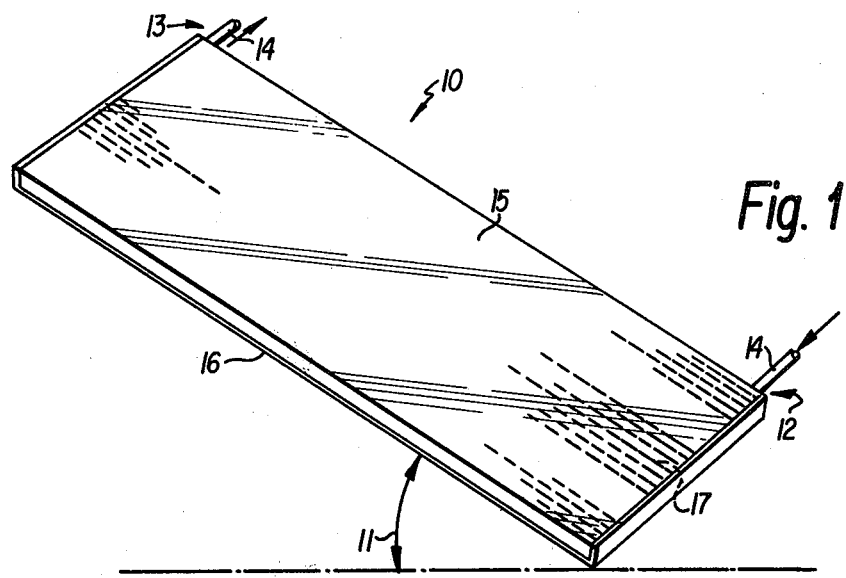
FIG. 1 is schematic representation of a solar collector panel positioned to receive the sun's radiation and shown with attachments for the introduction and removal of the solar collector working fluid.

Referring now to the figures, wherein indentical or similar parts are designated by the same reference numeral throughout and referring first to FIG. 1, the reference numeral 10 refers to a solar collector panel made in accordance with the present invention.

The solar collector panel comprises a cover of a transparent material such as plastic or glass which has its surface formed into suitable lenticulations for the purpose of the invention. The collector is shown flat and this is the preferred shape although it may be curved for a particular situation without departing from the concept of the instant invention.

The panel is preferably disposed at a suitable angle to the ground 11 which is such that the incident solar radiation will strike perpendicularly at the time of the equinox. The angle is in fact the same as the latitude where the panel is used. The panel is equipped with suitable means for conveying a working fluid into the panel 12 and out of the panel after exposure to the sunlight 13. These means will usually be a suitable form of pipe or tubing 14 which will be insulated to prevent entry or egress of heat and which will be of a material and size suitable for handling the working fluid in the quantities and at the temperatures attained.

Figure 2:
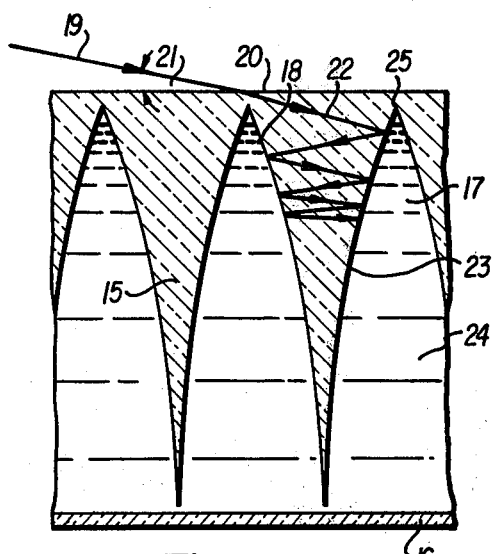
FIG. 2 is an enlargement of a small portion of the collector panel in section which illustrates the lenticular structure of the transparent cover section, and which shows in general the track of light incident on the surface of the panel at several angles. The manner in which the incident light is trapped in the panel and absorbed by the working fluid is shown in FIG. 3 where a low angle incident ray and a high angle incident ray are traced into the lenticulated construction of the transparent cover section to show the manner in which the radiation is trapped and transferred to the working fluid by multiple reflection of the radiant energy from the interface between the transparent cover section and the working fluid.

The panel 10 comprises a front section 15 containing the lenticulated pattern and a back section 16 which closes off the sheet to provide channels 17 through which the working fluid is carried. These are more clearly shown in FIG. 2. The form of the lenticulations 18 is shown in FIG. 2. The path of an incident light beam 19 is shown as it strikes the surface 20 at a low angle 21. The multiple reflection of the ray trace path 22 is shown as it enters the lenticulation 18 and is trapped in the material by the multiple reflection from the interface 23 between the lenticulations 18 and the fluid 24.

Figure 3:
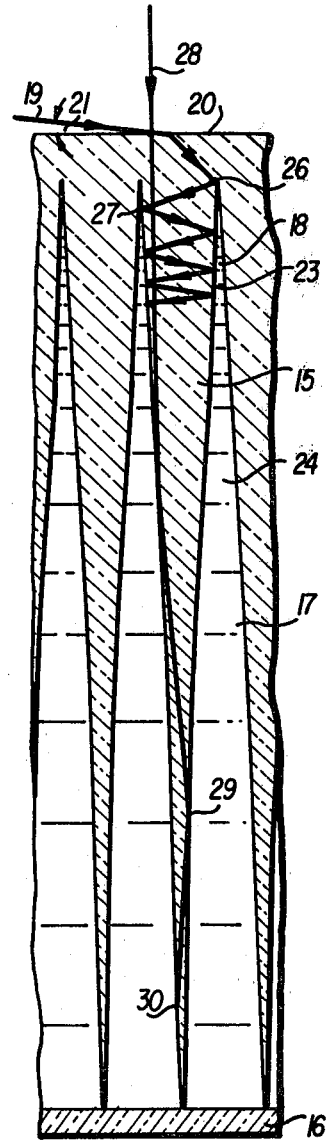

The shape of the lenticulations 18 is a smooth curve which may be a circular or conic section with two symmetric elements that intersect in a sharp angle at 25. It has been determined that this angle should be of the order of 5° in order to trap light that approaches the panel at an angle of 10° from the horizontal which in most circumstances is the lowest angle that sunlight can impinge on the collector panel. By reference to FIG. 3 it can be seen how the entering light is trapped in the panel. The low angle light beam 19 is shown entering the surface 20 at the low angle 21. The beam is refracted so that it strikes the lenticulation 18 at 26. It is then reflected from the interface 23 to the other side of the lenticulation at 27. This is repeated a number of times and as a result of the curve of the lenticulation, the angles of the reflections come closer to perpendicular. The multiple reflections transfer all of the incident radiation across the interface 23 to the working fluid 24. A high angle ray 28 enters the transparent lenticulated member 15, is reflected at 29, and then subsequently at 30, and is trapped at the bottom of the lenticulation 18 and the energy is totally absorbed.

Figure 4:
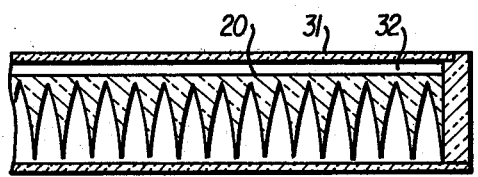
FIG. 4 is a schematic of a somewhat different embodiment of the invention where the cover section is supplied with a secondary transparent cover sheet to provide thermal insulation against convection cooling of the panel.

In many cases the solar collector panel will be used in an exposed situation where there will be wind and rain conditions. To minimize the convection loss of heat from the panel, it can be modified as shown in FIG. 4. The basic collector panel 10 has attached to the absorbing surface 20 a spaced transparent sheet 31 which forms a dead air space 32 between the surface 20 and the cover sheet 31 that insulates the collector thermally from the effects of environmental convection heat loss.

Figure 5:
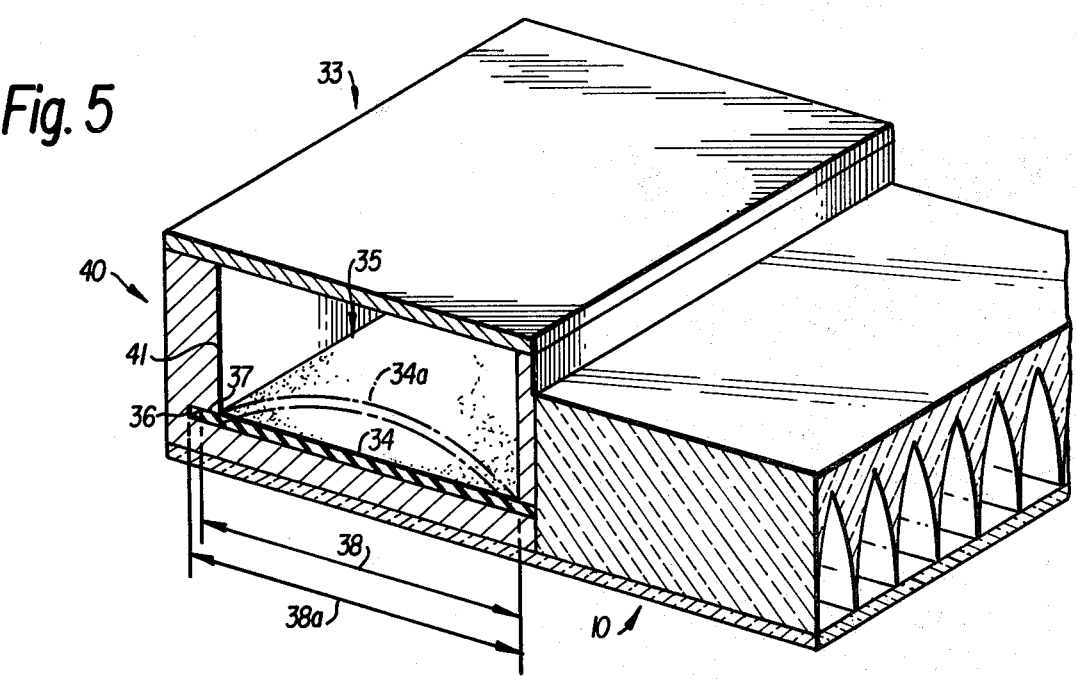
FIG. 5 is a diagrammatic representation of a thermally responsive valving element which may be incorporated into the panel to control the rate of flow of the working fluid through the panel.

The flow of the working fluid through the solar collector unit should be controlled so that the exit temperature is sufficiently high to have a high level of energy storage in the fluid. The means which seems best suited to this purpose is a thermostatic valve of some type which is responsive to the temperature of the fluid. While more complex systems can be used, it is one of the features of this invention that it uses a simple built in thermal sensing element that senses the temperature of the working fluid at the exit point from the panel and restricts the flow when it is too low and increases the flow when the temperature is at the desired level. This valve arrangement is shown schematically in FIG. 5. The valving element 33 is shown attached as a header to the solar collector panel 10. The exiting fluid from the panel passes between the membrane 34, 34a and the wall of the valve section 35. The membrane is in the restricted position as 34 and in the open position as 34a. The membrane is a material which expands when heated. It fits into the space 36 and has on it a detent element 37. The dimension 38 of the membrane and of the header 40 are made such that the membrane detent strikes the wall 41 when the fluid reaches the desired operating temperature. Above this temperature the continued expansion of the membrane 34 causes it to assume the alternative shape 34a by the buckling effect caused by the attempt to confine the increased length 38a in the length 40. The passage is opened and the rate of flow of the fluid is substantially increased. Since this reduces the time the working fluid is in the solar collector panel 10, it will result in reducing the exit temperature of the fluid. The membrane 34 will adjust to an equilibrium position that will maintain the flow at a level to maintain a uniform exit temperature for the working fluid.

Figure 6:
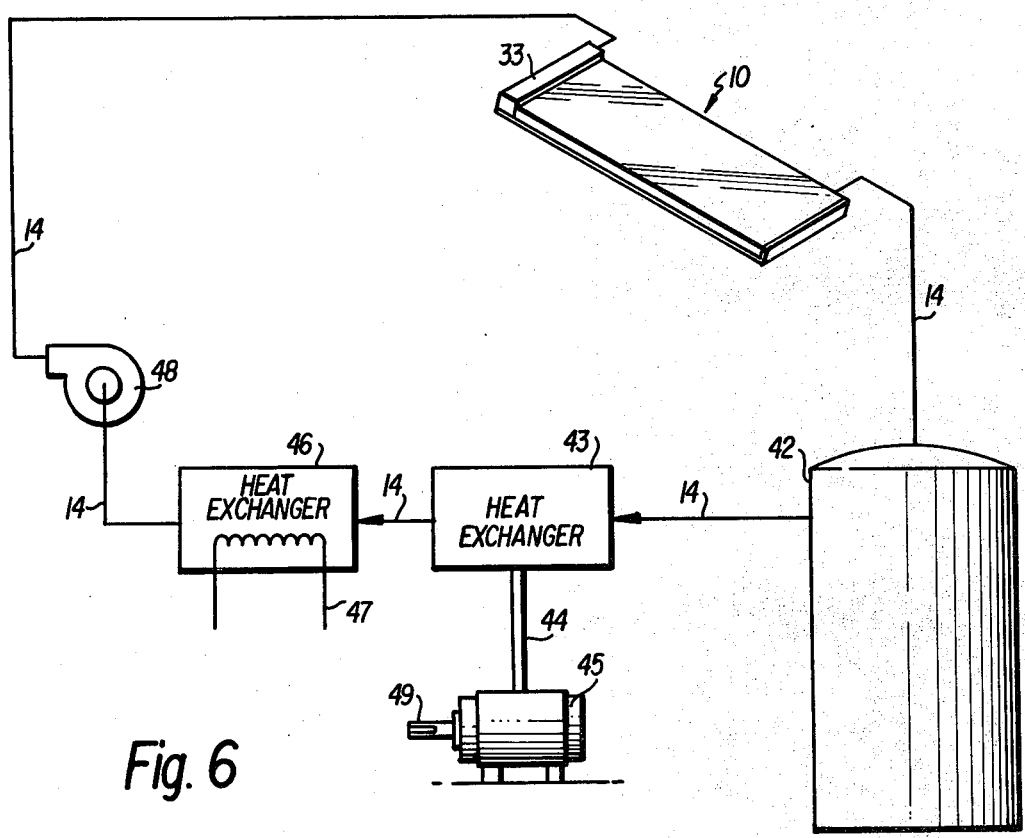
FIG. 6 is a schematic of a complete system utilizing the elements of the present invention. The solar collector panel is shown connected with a fluid storage reservoir, a heat engine capable of extracting shaft power from the working fluid, means for extracting sensible heat from the working fluid and means for circulating the fluid through the entire system.

FIG. 6 is a schematic representation of a solar energy collection and utilization system using the instant invention. The solar collector panel 10 is connected through the valving element 33 to a storage reservoir 42 by means of the piping 14. The storage reservoir is of sufficient size so that it can contain enough of the working fluid to act as a reserve to supply energy for night time use as well as for the extended periods when the sun light is not at peak. The reservoir is insulated thermally from the environment to prevent heat losses. Working fluid is drawn from the reservoir 42 and is fed to the heat exchanger 43 where the sensible heat is used to drive a heat engine 45. This can be a standard steam turbine or engine, a vapor engine using another lower boiling fluid such as one of the fluorocarbons, or even an air system unit such as a Stirling engine. The shaft power generated at 49 can be used in a variety of ways. It can be used to drive a heat pump for heating and cooling a building. The power can be used to generate electricity which may be directly used or stored. It can also be used to drive the pump 48 which would provide for forced circulation of the working fluid through the system. The working fluid can also be piped by means of the lines 14 to a heat exchanger 46 which will withdraw sensible heat by means of the extraction element 47. This heat can be utilized to heat a building, heat water for general washing use, or be used as heat in an absorbtion cooling air conditioning system. Preferably this heat exchanger uses the fluid exhausted from the heat engine system which has already extracted most ot the FREE ENERGY of the working fluid. After leaving the heat exchanger 46 the fluid is conveyed by means of the lines 14 to a pump 48 previously noted. The pump 48 is an optional element in the system to be used for the forced circulation of the working fluid through the system. In most cases the thermal gradient in the solar collector panel should provide a sufficient drive to circulate the working fluid through the system.

The working fluid is a material which comprises a dispersion of a polymer in a suitable liquid carrier. The polymers that are used are those which are crystalline over certain temperature ranges, examples of which are polyethylene and polypropylene. A table of a number of polymers which are usuable in the system is given in FIG. 7. In the case of polyethylene and polypropylene, a suitable liquid carrier could be ethylene glycol or propylene glycol which are commonly available liquids used for heat exchange fluids in a variety of applications including automobile engines. These liquids have high boiling points, 198° C. for ethylene glycol and 213° C. for propylene glycol, and they are mutually soluble with water. They have high specific heats in the range of 0.6 for the operating temperatures used in the solar collector and, by mixing with water to bring the boiling point down to slightly over the normal operating temperatures, the specific heat of the solutions will be in the range of 0.8. This makes the solutions efficient heat storage media even without considering the effects produced by the latent heat storage mechanism of the polymer in the dispersion.

The specific example we will examine is the use of a high density polyethylene material Marlex 6050 dispersed in a 50% solution of ethylene glycol-water. The specific heat of the solution is 0.8 in the range of interest and the boiling point is in excess of 150° C. The HD polyethylene has a crystalline melting temperature of 132° C. and a heat of fusion by crystalline melting of the polymer of 44 calories per gram. The dispersion with up to 60% by weight of the polymer dispersed in the solution is still a relatively low viscosity fluid easily capable of flowing through the collector unit. It should be pointed out that the crystalline melting of the polymer does not involve an actual change of phase to a liquid. The material merely undergoes a change from a crystalline polymer to an amorphous material. As a consequence the solid in liquid dispersion is not affected by the change.

Advantageously the polymer has dispersed therein a carbon black material which will make it an efficient light and radiant energy absorber. This is done by methods well known in the prior art. The polymer is then dispersed into the glycol-water solution with the aid of a suitable dispersing agent, e.g. glycerol triricomoleate 1%, and the use of intensive shear mixing as is done by a Charlotte or other colloid mill. The resulting dispersion is the working fluid which is advantageously used in the instant invention. The thermal properties of the fluid are as follows:

Specific heat is the weight average for polyethylene 0.55 and the ethylene glycol-water solution 0.8 which gives ... 0.65
The latent heat storage at 60% polymer dispersion ... 26.5 cal/gm
Boiling point ... ca 150° C.
As a result, if the fluid exits from the solar collector panel at 135° C., it will have a heat content of $$(135° - 20° C.) \times 0.65 + 26.5 = 101.25 \text{ cal/gm}$$

of which 26.5 cal/gm are releasable at 132° C. which can be used to operate the heat engine. For example, the use of water as the fluid for the heat engine will make steam at a pressure of 27 psi. Utilizing other heat engine fluids would be equivalent to the relative increase over the boiling points.

If the primary purpose of the solar collector is to generate large amounts of shaft power efficiently, it is obvious that other combinations can be utilized.

For example, from the table Delrin 100 has a crystalline melting temperature of 181° C. and it could be used in conjunction with propylene glycol to generate steam at a pressure of 135 psi. The utilization of still higher melting polymers is possible up to 400°-500° C. used in conjunction with suitable fluids and would extend the operating temperature range of the system.

The transparent surface panel of the solar collector panel 15 is advantageously made of a transparent plastic material when used in conjunction with the example working fluid of polyethylene/ethylene glycol/water. Among the suitable plastics materials would be a polymer or copolymer of methyl methacrylate which has been shown to have excellent resistance to the outdoor environment. Another material with a somewhat higher heat resistance that could be employed in the lenticulated cover panel 15 would be a polycarbonate polymer which is used extensively in glazing applications and has good weathering properties. These materials can be fabricated into the lenticulated form by extrusion, casting, press molding or similar processes. For higher temperature systems glasses of various types would be employed and these can be fabricated into the suitable structures by pressing or grinding or other well known methods. In the case of the plastics panel members they are such that they would easily resist abuse in handling. The glass structures would be somewhat more fragile and would require careful handling and design of the assembly.

In reference to the orientation of the collector panel with respect to the sun, it should be noted that the arrangement suggested is only indicated as the most efficient one. By the nature of the light trapping lenticulations light which enters the sheet at an angle to the axis is even more effectively trapped than the perpendicular rays since the angular approach causes the rays to intersect the wall at an effectively larger angle which will increase the penetration of the ray into the lenticulation. If the panel is tilted transversely it will not be as efficient at catching either the early morning or late evening rays, but since these rays are low angle ones with relatively low energy content the full day efficiency will not be impaired materially.

Numerous alternatives of the collector system and collector panel as well as the working fluid will suggest themselves to those skilled in the art. However, it is to be understood that the present disclosure relates to a preferred embodiment of the invention which is for purposes of illustration only and it is not to be construed as a limitation of the invention.

What is claimed is:

1. A solar energy collector system comprising a lenticulated collector, and substitute-an energy storage fluid comprising a dispersion of a crystalline polymer in a carrier fluid means for controllably circulating said energy storing fluid through said lenticulated collector panel and thence on to a heat engine and a heat exchanger whereby the energy collected in said energy storage fluid is converted to useful shaft work and also exchanged with other fluids for heating.

2. A solar collector panel as described in claim 1 comprising a transparent member with lenticulations running the length of the member, a closing member on the back of said lenticulated member, means for introducing said energy storage fluid into the spaces between the longitudinal lenticulations at one of the ends of said collector panel, and means for controllably removing said energy storage fluid from the other end of said solar collector panel.

3. A solar collector panel as described in claim 2 wherein the lenticulations are cylindrical curves which intersect at an acute angle between 3° and 10° to provide deep channels in the transparent cover element which characteristically trap substantially all of the incident light.

4. A solar panel transparent cover element as described in claim 3 wherein the portions of the collector panel between the lenticular elements forms a passage for the said energy storage fluid.

5. A solar energy collector panel as described in claim 3 wherein the transparent lenticulated element is made of a plastic such as polymethyl methacrylate by extrusion.

6. A solar energy collector panel as described in claim 3 wherein the transparent lenticulated element is made from glass by casting.

7. A transparent cover element as described in claim 4 wherein the material of construction is selected from the group comprising the the transparent plastics.

8. A transparent cover element as described in claim 4 wherein the material of construction is selected from the group comprising the transparent glasses.

9. A solar energy collector panel as described in claim 2 wherein the lenticulations are closed off to form channels for said energy storage fluid by a back plate member which is fastened to said transparent lenticulated cover element by suitable means to provide leakproof channels for the flow of said energy storage fluid.

10. A solar energy collector panel as described in claim 2 wherein said means for controllably removing said energy storage fluid from said channels in said energy collector panel comprises a thermostatic valve comprising a membrane element which is confined in a restricted enclosure. The expansion of said membrane element as a consequence of increased temperature causes it to buckle and consequently open a passage through said restricted enclosure to permit passage of said energy storage fluid when the appropriate temperature is reached.

11. A solar energy collector system as described in claim 1 wherein the heat engine is a vapor turbine system utilizing water or another volatizable fluid.

12. A solar energy collector system as described in claim 1 wherein the heat engine is a Stirling cycle gas phase engine.

13. A solar energy collector system as described in claim 1 wherein the energy storage fluid is a dispersion of carbon black filled linear polyethylene in a water solution of ethylene glycol.

14. A solar energy collector system as described in claim 1 wherein the energy storage fluid is a dispersion of carbon black filled polyoxymethylene in a polyprolylene glycol water solution.

15. A solar collector system energy storage fluid which comprises a dispersion of a crystalline polymer in a heat transfer fluid whereby heat energy is stored as both sensible heat and as latent heat of crystallization in said storage fluid.

16. An energy storage fluid as described in claim 15 wherein the crystalline polymer is selected from the group of polyolefin comprising polyethylene, linear polyethylene, polypropylene, polybutylene, and higher homologues which are crystalline in structure.

17. An energy storage fluid as described in claim 15 wherein the crystalline polymer is selected from the group of crystalline oxygen linked polymers comprising polymethylene oxide, polyethylene oxide, polypropylene oxide, and higher homologues which are crystalline in nature.

18. An energy storage fluid as described in claim 15 wherein the crystalline polymer is a polyamide typified by poly E-caprolactam.

19. An energy storage fluid as described in claim 15 wherein the heat transfer fluid is selected from the group comprising ethylene glycol, propylene glycol and higher homologues thereof mixed with water.

* * * * *